United States Patent Office 3,479,326
Patented Nov. 18, 1969

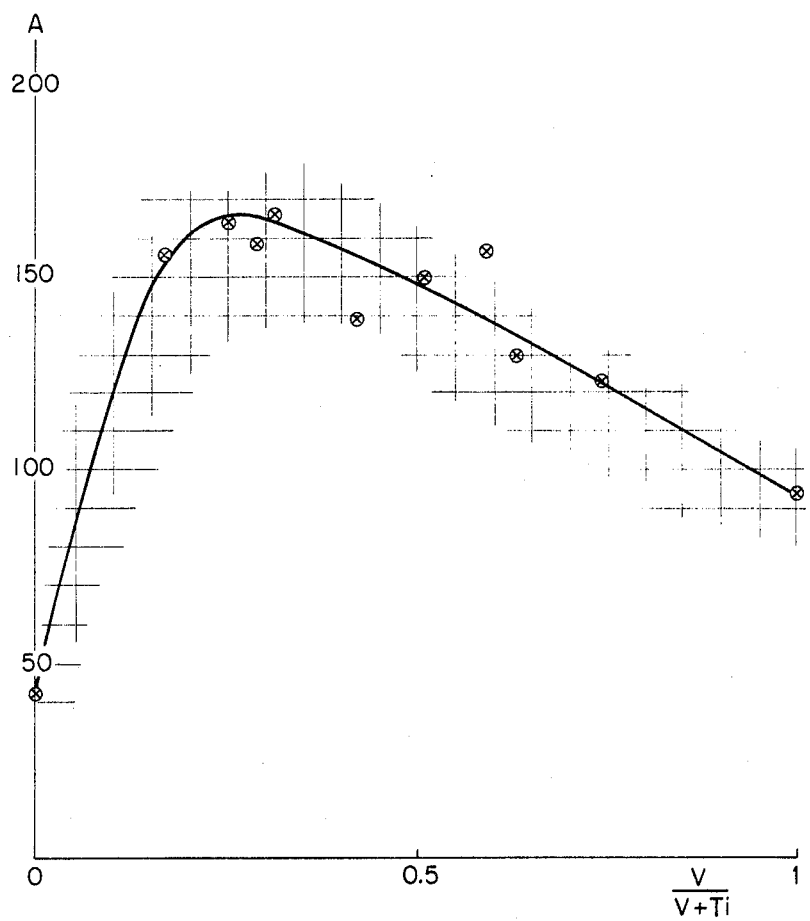

3,479,326
PROCESS AND CATALYSTS FOR POLYMERIZA-
TION AND COPOLYMERIZATION OF OLEFINS
AND THE RESULTANT POLYMERS AND
COPOLYMERS
Andre Delbouille, Auderghem-Brussels, and Henri Toussaint, Schaerbeek-Brussels, Belgium, assignors to Solvay
& Cie, Brussels, Belgium, a company of Belgium
Filed Feb. 23, 1967, Ser. No. 618,146
Claims priority, application France, Feb. 24, 1966,
50,945
Int. Cl. C08f 1/56, 1/36
U.S. Cl. 260—80.78          11 Claims

ABSTRACT OF THE DISCLOSURE

Olefins are polymerized and copolymerized in the presence of a catalyst constituted of the reaction product of a compound of an element of Group IV$b$ of the Periodic Table, a compound of an element of Group V$b$ of the Periodic Table and a copolymer of vinyl alcohol containing 1 to 20 mol percent of polymerized vinyl alcohol and an activator which is a metal of Groups I to III of the Periodic Table or a hydride or organometallic compound of the Groups I to III metals.

BACKGROUND OF THE INVENTION

The present invention relates to a process for the polymerization of olefins and the copolymerization of olefins between themselves and/or with non-conjugated diolefins, in the presence of novel solid catalysts. This process is, for example, particularly applied to the manufacture of ethylene copolymers with propylene and a non-conjugated cyclic or acyclic diene.

In Belgian Patent No. 663,922, there is described a process of polymerization and copolymerization of olefins in the presence of a catalyst constituted of the product of the reaction between a transition metal compound and a copolymer of vinyl alcohol containing from 1 to 20 mol percent of vinyl alcohol in a polymerized state in its molecules this product being activated by a metal of Groups I to III of the Periodic Table, a hydride or an organometallic compound of the Groups I to III metals.

It was also disclosed in that patent that the catalysts described therein are suitable for the copolymerization of one or more olefins with non-conjugated diolefins and permit, in particular, the manufacture of terpolymers of ethylene-propylene- non-conjugated diene. It is also disclosed that the transition metal compounds for the preparation of the catalysts are the halides, the halogeno-alkoxides and the alkoxides of the metals of Groups IV$b$, V$b$ and VI$b$ of the Periodic Table, especially titanium and vanadium.

SUMMARY OF THE INVENTION

It has been found, according to the invention, that by using, for preparation of polymerization catalysts, two different transition metal compounds, of which one is selected from compounds of the elements of Group IV$b$ of the Periodic Table and the other from the compounds of the elements of Group V$b$ of the Periodic Table, the catalysts obtained have remarkably improved properties.

According to the invention, the polymerization of olefins or the copolymerization of olefins with themselves and/or with non-conjugated diolefins is effected in the presence of a catalyst comprising the product of the reaction of a compound of an element of Group IV$b$ and a compound of an element of Group V$b$ of the Periodic Table with a copolymer of vinyl alcohol containing 1 to 20 mol percent of vinyl alcohol in a polymerized state in its molecules, and an activator which is a metal of Groups I to III of the Periodic Table or a hydride or an organometallic compound of a Groups I to III metal.

BRIEF DESCRIPTION OF THE DRAWING

The drawing is a plot of the relationship of the activity of a catalyst of the invention in a particular copolymerization to the relative proportions of a Group IV$b$ and a Group V$b$ metal in the catalyst.

DESCRIPTION OF THE PREFERRED EMBODIMENTS

The copolymers of vinyl alcohol which may be used in the process of the invention may be made by any of the conventional processes for the preparation of polymers and copolymers of vinyl alcohol, starting with hydrolyzable polymers. They can be obtained, in particular, by the total or partial hydrolysis of the ester groups of copolymers of vinyl acetate, namely vinyl acetate-ethylene copolymers and vinyl acetate-vinyl chloride copolymers, by partial hydrolysis of poly(vinyl acetate) as well as by hydrolysis of the ether groups of polymers and copolymers of a vinyl ether. Another method of preparation of these copolymers consists of effecting partial esterification of a vinyl polyalcohol. A particular example of a copolymer of vinyl alcohol which may be used in the invention contains 8.3 mol percent of vinyl alcohol, 89.5 mol percent of vinyl chloride and 2.2 mol percent of vinyl acetate.

The vinyl alcohol content of the copolymer is critical: if it is too high, exceeding 20 mol percent, there are too many reactive groups for the Groups IV$b$ and V$b$ compounds and several valences of the compounds can react with and thereby cross-link the copolymer; if the vinyl alcohol content is too low, being below about 1 mol percent, the quantity of the compounds which reacts with the copolymer is insufficient.

One of the compounds which is reacted with the vinyl alcohol copolymer is a Group IV$b$ compound having functionality highly reactive with hydroxyl groups. Preferably, this compound is a halide, halogeno-alkoxide or alkoxide of titanium or zirconium. Titanium tetrachloride is particularly preferred.

The other compound which is reacted with the vinyl alcohol copolymer is a compound of an element of Group V$b$ element having functionality which is reactive with hydroxyl groups. These compounds are preferably halides, oxyhalides, halogeno-alkoxides and alkoxides, most preferably of vanadium.

The reacting of two transition metal compounds, rather than only one, with the vinyl alcohol copolymer support does not appreciably effect the total amount of transition metal fixed on the support. Rather, in either case, this amount is determined by the nature of the support and the conditions of the reaction by which the transition metal compounds are reacted with the support.

The reaction of the two transition metal compounds with the vinyl alcohol copolymer support is effected preferably simultaneously by placing the copolymer in suspension in a mixture of the two transition metal compounds if the transition metal compounds are liquids or in a solution of the transition metal compounds in an inert solvent. The inert solvent is preferably a hydrocarbon, such as hexane, xylene or tetralin.

The preferred temperatures for the reaction of the vinyl alcohol copolymer support with the transition metal compounds is between about 60 and 150° C. In this temperature range, generally the higher the reaction temperature the greater the amount of the transition metal compounds reacted with the vinyl alcohol copolymer and the greater the activity of the catalyst obtained. The reaction is conducted in a relatively dry atmosphere and with dry reagents.

The molar ratio of the two transition metal compounds to be employed in the reaction depends on the desired transition metal content of the catalyst and the relative reactivities of the two compounds with the hydroxyl groups of the vinyl alcohol copolymer. There is employed in the reaction mixture a higher proportion than that desired in the catalyst of the less reactive compound. The ratio of the two transition metal compounds to be reacted on the vinyl alcohol copolymer support depends on the particular catalytic system ultimately desired and the monomers to be polymerized or copolymerized by the use of the catalytic system. It is found that a maximum catalytic activity is obtained when the molar ratio of the Group Vb compound to the total of both transition metal compounds is between about 0.1 and 0.8. The exact value of this molar ratio at which the maximum activity is obtained varies according to the polymerization conditions.

After the reaction, the two transition metal compounds are chemically fixed to the support and cannot be removed from it by physical means, such as washing.

The reaction product of the support and the transition metal compounds is thoroughly washed and then this component of the catalyst is contacted with and thereby activated by the other component of the catalyst, namely, the activator. The activator is a metal of Groups I to III of the Periodic Table or a hydride or organometallic compound thereof. The activation may be effected immediately before the introduction of the monomers. Alternatively, the activation may be effected sometime before the introduction of the monomers and during this period the catalyst allowed to mature at ambient temperature or at an elevated temperature.

In the polymerization or copolymerization of olefins, in every case the catalysts of the present invention demonstrate greater activity. This increase in activity relative to the prior art is particularly great in the case of the copolymerization of ethylene with propylene to obtain elastomers.

The catalyst of the invention is particularly suited for the manufacture of unsaturated elastomers by copolymerization of at least one olefin with non-conjugated diolefins, particularly: non-conjugated aliphatic dienes, such as pentadiene-1,4, hexadiene-1,4 and hexadiene-1,5; non-conjugated monocyclic dienes, such as 4-vinylcyclohexene, 1,3-divinylcyclohexane and cyclooctadiene-1,5; and alicyclic dienes having an endocyclic bridge, such as dicyclopentadiene and norbornadiene.

Employed in the manufacture of such unsaturated elastomers, the catalysts of the present invention result in the obtaining of products having a higher degree of unsaturation, because a greater proportion of the non-conjugated diolefin is incorporated in the copolymer.

Vulcanizates obtained from these elastomers have mechanical properties, particularly a resistance to traction, notably improved in comparison to the properties of products obtained by the use of catalysts containing only one transition metal compound. Moreover, when the molar relationship of the two transition metal compounds present in the catalyst is varied, the mechanical properties of the ultimate vulcanizates are altered, and, in this way, one is able to control these properties by the selection of the molar relationship of the two transition metal compounds.

The following examples are intended to illustrate but not to limit the present invention.

EXAMPLE I.—PREPARATION OF THE CATALYSTS

Method A 10 g. of a copolymer containing 8.3 mol percent of vinyl alcohol, 89.5 mol percent of vinyl chloride and 2.2 mol percent of vinyl acetate is suspended in 100 ml. of isooctane. Into this suspension is introduced a total of 0.051 g.-mol of a mixture of $TiCl_4$ and $VOCl_3$ in various proportions, or, for the purpose of reference tests, of one of these compounds alone. The temperature of the suspension is raised to 90° C. and maintained at that level for one hour. The solid thus obtained is separated, thoroughly washed with anhydrous hexane and dried. The amounts of titanium and vanadium fixed on the copolymer are determined.

Method B 29 g. of the same copolymer as above is suspended in 500 g. of $TiCl_4$. The temperature of the suspension is raised to 130° C. in a period of about one-half hour and maintained at that level for a period of one hour. The suspension is then permitted to cool, and the solid is separated therefrom and washed six to eight times with dry hexane. Then, the solid is dried and the content of fixed titanium is determined.

A number of catalysts are prepared according to methods A and B. The quantities of the reagents employed and the characteristics of the supported catalyst components obtained are summarized in Table I as follows:

TABLE I

| Test Number | $TiCl_4$ reagent, mols | $VOCl_3$ reagent, mols | Molar ratio, V/V+Ti | Method of preparation | Total transition metals fixed, mg./g. of support | $TiCl_4$ fixed, mg./g. of support | $TiCl_4$ fixed, mmols/g. of support | $VOCl_3$ fixed, mg./g. of support | $VOCl_3$ fixed, mmols/g. of support | Molar ratio, V/V+Ti ratio |
|---|---|---|---|---|---|---|---|---|---|---|
| 1 | 2.64 | | 0 | B | 289 | 289 | 1.52 | | | 0 |
| 2 | 2.64 | | 0 | B | 296 | 296 | 1.56 | | | 0 |
| 3 | 2.64 | | 0 | B | 344 | 344 | 1.81 | | | 0 |
| 4 | 0.051 | | 0 | A | 243 | 243 | 1.28 | | | 0 |
| 5 | | 0.051 | 1 | A | 244 | | | 244 | 1.41 | 1 |
| 6 | | 0.051 | 1 | A | 242 | | | 242 | 1.40 | 1 |
| 7 | | 0.051 | 1 | A | 247 | | | 247 | 1.43 | 1 |
| 8 | 0.0445 | 0.0065 | 0.125 | A | 240 | 202 | 1.06 | 38 | 0.22 | 0.17 |
| 9 | 0.038 | 0.013 | 0.25 | A | 293 | 224 | 1.18 | 69 | 0.40 | 0.25 |
| 10 | 0.038 | 0.013 | 0.25 | A | 309 | 226 | 1.19 | 83 | 0.48 | 0.29 |
| 11 | 0.032 | 0.019 | 0.375 | A | 256 | 182 | 0.96 | 74 | 0.43 | 0.31 |
| 12 | 0.0255 | 0.0255 | 0.50 | A | 235 | 144 | 0.755 | 91 | 0.525 | 0.41 |
| 13 | 0.019 | 0.032 | 0.625 | A | 263 | 135 | 0.71 | 128 | 0.74 | 0.51 |
| 14 | 0.013 | 0.038 | 0.75 | A | 245 | 110 | 0.58 | 145 | 0.84 | 0.59 |
| 15 | 0.013 | 0.038 | 0.75 | A | 255 | 100 | 0.525 | 155 | 0.895 | 0.63 |
| 16 | 0.006 | 0.045 | 0.875 | A | 262 | 72 | 0.38 | 190 | 1.10 | 0.74 |

Examination of Table I shows that the total amount of transition metals fixed on the support varies only slightly with the proportions of the transition metal compounds ($TiCl_4$ and $VOCl_3$) employed as reagents. It is also seen from Table I that the molar ratio V/V+Ti is always lower in the catalyst than in the reaction mixture; this indicates that $VOCl_3$ is less reactive than the $TiCl_4$ with the hydroxyl groups of the support.

It is noted that tests 1 to 7 are given as references and that the catalysts prepared in these tests are subsequently used for polymerization reference tests.

EXAMPLE II.—POLYMERIZATIONS

A. Copolymerization of ethylene and propylene

The data for the polymerization tests is summarized in Table II below. Each of these tests was carried out in the following manner.

The triisobutylaluminum, diluted with 2 to 3 ml. of hexane, is introduced into a 1.5 l. autoclave which has been dried and flushed with nitrogen; then the catalyst is introduced into the autoclave and, finally, 336 g. of propylene is introduced into the autoclave. The temperature of the system is raised to 40° C. and, simultaneously, ethylene is introduced so as to maintain a constant pressure of 19.2 kg./cm.$^2$. After the passage of the time shown in Table I, the unreacted monomers are removed and the amount of elastomeric copolymer of ethylene and propylene indicated in the table is recovered.

TABLE II

| | Test No. 17 | Test No. 18 | Test No. 19 |
|---|---|---|---|
| No. of the catalyst preparation test | 2 | 12 | 5 |
| Ratio V/V+Ti in the catalyst | 0 | 0.41 | 1 |
| Weight of catalyst prepared, g | 0.237 | 0.117 | 0.464 |
| Total quantity of the transition elements in the catalyst (V+Ti), mmols/g | 1.56 | 1.28 | 1.41 |
| Total quantity of transition elements in the reaction mixture (V+Ti), mmols | 0.37 | 0.15 | 0.65 |
| Quantity of Al(i-C$_4$H$_9$)$_3$ in the reaction mixture, mmols | 1.98 | 0.79 | 3.79 |
| Duration of the polymerization, hr | 1.75 | 2 | 2 |
| Weight of copolymer obtained, g | 137 | 172 | 136 |
| Catalytic activity, copolymer weight/ mmols (V+Ti)·hr | 212 | 573 | 105 |

Table II shows that a synergistic effect is obtained. Specifically, the catalyst of test 18, in which both a titanium compound and a vanadium compound are reacted onto the vinyl alcohol polymer, has an activity far greater than double that of catalysts in which only a titanium compound (test 17) or a vanadium compound (test 19) is reacted onto the vinyl alcohol copolymer.

B. Copolymerization of ethylene with propylene and hexadiene-1,4

This is conducted exactly the same as the copolymerization of ethylene and propylene but 28.5 g. of hexadiene-1,4 is introduced into the autoclave before the introduction of the propylene; also, the triisobutylaluminum is replaced by triethylaluminum. The data for this set of tests is summarized in Table III below.

TABLE III

| | Test No. 20 | Test No. 21 | Test No. 22 |
|---|---|---|---|
| No. of the catalyst preparation test | 3 | 15 | 7 |
| Ratio V/V+Ti in the catalyst | 0 | 0.63 | 1 |
| Weight of catalyst prepared, g | 0.437 | 0.354 | 0.560 |
| Total quantity of the transition elements in the catalyst (V+Ti), mmols/g | 1.81 | 1.42 | 1.43 |
| Total quantity of transition elements in the reaction mixture (V+Ti), mmols | 0.79 | 0.50 | 0.80 |
| Quantity of Al(C$_2$H$_5$)$_3$ in the reaction mixture, mmols | 4.03 | 2.64 | 3.96 |
| Duration of the polymerization, hr | 2 | 2 | 2 |
| Weight of copolymer obtained, g | 134 | 145 | 120 |
| Catalytic activity, copolymer weight/ mmols (V+Ti)·hr | 85 | 145 | 75 |

Here again the synergistic effect of the titanium and vanadium compounds fixed on the vinyl alcohol copolymer is indisputable, because test 21 shows a catalytic activity double that obtained in the better of reference tests 20 and 22.

C. Copolymerization of ethylene with propylene and dicyclopentadiene

These tests are carried out exactly as the tests in which ethylene and propylene are copolymerized but 18.5 g. of dicyclopentadiene is introduced into the autoclave before the propylene is introduced. The data for these tests is summarized in Table IV below.

TABLE IV

| | Test No. 23 | Test No. 24 | Test No. 25 | Test No. 26 | Test No. 27 | Test No. 28 | Test No. 29 | Test No. 30 | Test No. 31 | Test No. 32 | Test No. 33 |
|---|---|---|---|---|---|---|---|---|---|---|---|
| No. of the catalyst preparation test | 1 | 8 | 9 | 10 | 11 | 12 | 13 | 14 | 15 | 16 | 7 |
| Ratio V/V+Ti in the catalyst | 0 | 0.17 | 0.25 | 0.29 | 0.31 | 0.42 | 0.51 | 0.59 | 0.63 | 0.74 | 1 |
| Weight of catalyst prepared, g | 0.515 | 0.298 | 0.229 | 0.264 | 0.290 | 0.420 | 0.258 | 0.324 | 0.310 | 0.276 | 0.359 |
| Total quantity of the transition elements in the catalyst (V+Ti), mmols/g | 1.52 | 1.28 | 1.58 | 1.67 | 1.39 | 1.28 | 1.45 | 1.42 | 1.42 | 1.48 | 1.43 |
| Total quantity of transition elements in the reaction mixture (V+Ti), mmols | 0.78 | 0.38 | 0.36 | 0.44 | 0.40 | 0.54 | 0.37 | 0.46 | 0.44 | 0.41 | 0.51 |
| Quantity of Al(i-C$_4$H$_9$)$_3$ in the reaction mixture, mmols | 3.95 | 1.98 | 1.98 | 1.98 | 2.14 | 2.85 | 1.98 | 2.29 | 2.21 | 2.05 | 2.52 |
| Duration of the polymerization, hr | 3 | 1.5 | 1.75 | 1.5 | 1.25 | 2 | 2 | 1.5 | 2 | 2 | 2 |
| Weight of copolymer obtained, g | 98 | 88 | 104 | 104 | 83 | 149 | 112 | 111 | 111 | 100 | 97 |
| Catalytic activity A, copolymer weight/ mmols (V+Ti)·hr | 42 | 155 | 164 | 158 | 165 | 139 | 150 | 161 | 126 | 123 | 94 |

The catalytic activities in Table IV have been designated "A" for the purpose of convenience in designating y-axis in the plot which constitutes the drawing of the application. Once again there is illustrated the synergistic effect of having both a titanium compound and a vanadium compound reacted onto the support.

Another advantageous feature of the catalyst of the invention is that the copolymers have a greater degree of unsaturation and vulcanizates obtained from them have improved mechanical properties.

The terpolymers obtained in tests 23, 31 and 33 were vulcanized at 155° C., by use of the following formula, which is a conventional formula for sulfur vulcanization:

| | Parts |
|---|---|
| Terpolymer | 100 |
| Black HAF | 50 |
| Zinc stearate | 1 |
| Zinc oxide | 5 |
| Phenylbetanaphthylamine | 0.2 |
| Tetramethylthiuram disulfide | 1.2 |
| Sulfur | 1 |

The vulcanizates prepared in this way are subjected to traction tests (ASTM D 946–47 T). The permanent elongation of the sample is measured after 15 minutes of relaxation, the sample having been stretched to three times its length for a period of 24 hours. The results of these tests are set forth in Table V below, in which the two test terpolymers prepared with catalysts containing only titanium (test 23) or vanadium (test 33) are compared with a terpolymer prepared according to the invention (test 31).

TABLE V

| Test No. of the terpolymer manufacture | 23 | 31 | 33 |
|---|---|---|---|
| Modulus at 100% elongation, kg./cm.$^2$ | 45 | 46 | 58 |
| Breaking tension, kg./cm.$^2$ | 77.5 | 194 | 119 |
| Elongation at break, percent | 247 | 400 | 236 |

The mechanical properties of the vulcanizates clearly show the superiority of the ethylene-propylene-dicyclopentadiene terpolymers made according to the present invention. Specifically, the breaking tension and the elongation at break are greater.

While the invention has been described by reference to particular embodiments, it is to be understood that these embodiments are intended to be illustrative rather than restrictive.

What we claim and desire to secure by Letters Patent is:

1. Process for the polymerization and the copolymerization of α-olefins and the copolymerization of α-olefins with one another and with a non-conjugated diolefin selected from the group consisting of linear, aliphatic diene having terminal unsaturation, monocyclic diene and alicyclic diene having an endocyclic bridge, comprising contacting the polymerization reactants with a catalyst comprising the reaction product of a compound of a transition metal of Group IV$b$ of the Periodic Table and a compound of a transition metal of Group V$b$ of the Periodic Table, in a molar ratio of said Group IV$b$ transition metal compound to the total of said Group V$b$ transition metal compound and said Group IV$b$ transition metal compound of about 0.1 to 0.8 with a copolymer of vinyl alcohol containing 1 to 20 mol percent of vinyl alcohol in its molecules and an activator selected from the group consisting of the metals of Groups I to III of the Periodic Table and hydrides and organometallic compounds of said Groups I to III metals, said compound of said transition metals of Group IV$b$ and Group V$b$ being selected from the group consisting of halide, haloalkoxide and alkoxide.

2. Process according to claim 1, in which the compound of a transition metal of Group IV$b$ of the Periodic Table is selected from the group consisting of halides, halogenoalkoxides and alkoxides of titanium and zirconium.

3. Process according to claim 2, in which the compound of a transition metal of Group V$b$ of the Periodic Table is selected from the group consisting of halides, oxyhalides, halogeno-alkoxides and alkoxides of vanadium.

4. Process according to claim 1, in which ethylene and propylene are copolymerized.

5. Process according to claim 1, in which ethylene, propylene and a non-conjugated diolefin are copolymerized.

6. Process according to claim 1, in which ethylene, propylene and hexadiene-1,4 are copolymerized.

7. Process according to claim 1, in which ethylene, propylene and dicyclopentadiene are copolymerized.

8. Process according to claim 1 in which said compound of a transition metal of Group V$b$ of the Periodic Table is a vanadium compound and said compound of a transition metal of Group IV$b$ of the Periodic Table is titanium tetrachloride.

9. In a process for the polymerization of an α-olefin and the copolymerization of α-olefins with one another and with a non-conjugated diene selected from the group consisting of aliphatic linear diolefins having terminal unsaturation, monocyclic dienes and alicyclic dienes having an endocyclic bridge which comprises carrying out said polymerization and said copolymerization in the presence of a catalyst constituted by the product of reaction of a halide, a haloalkoxide or an alkoxide of a transition metal of Group IV$b$, V$b$ or VI$b$ of the Periodic Table with a vinyl alcohol copolymer containing 1 to 20 molar percent of vinyl alcohol in the state of polymerization in its molecule, this product being activated by a metal, a hydride or an organometallic compound of metals of the Groups I to III of the Periodic Table, the improvement comprising using as said reaction product, the reaction product of said vinyl alcohol copolymer with a halide, a haloalkoxide or an alkoxide of a transition metal of Group IV$b$ and of a halide, a haloalkoxide or an alkoxide of a transition metal of Group V$b$ in which the molar ratio of said Group V$b$ transition metal compound to the total of Group V$b$ and Group IV$b$ transition metal compounds in said mixture is between about 0.1 and 0.8.

10. In a catalyst, the element constituting the reaction product of a compound of a transition metal of Group IV$b$ of the Periodic Table and a compound of a transition metal of Group V$b$ of the Periodic Table, in a molar ratio of said Group IV$b$ transition metal compound to the total of said Group V$b$ transition metal compound and said Group IV$b$ transition metal compound of about 0.1 to 0.8 with a vinyl alcohol copolymer containing 1 to 20 mol percent of vinyl alcohol in its molecules, said compound of said transition metals of Group IV$b$ and Group V$b$ being selected from the group consisting of halide, haloalkoxide and alkoxide.

11. A catalyst comprising the catalyst element of claim 10 in combination with an activator selected from the group consisting of the metals of Groups I to III of the Periodic Table and hydrides and organometallic compounds of said Groups I to III metals.

References Cited

UNITED STATES PATENTS 3,396,155  8/1968  Delbouille _____ 260—80.78

JOSEPH L. SCHOFER, Primary Examiner

R. S. BENJAMIN, Assistant Examiner

U.S. Cl. X.R.

252—431; 260—88.2, 93.7, 94.9